US005943023A

United States Patent [19]

Sanford

[11] Patent Number: 5,943,023

[45] Date of Patent: Aug. 24, 1999

[54] FLARED TROUGH WAVEGUIDE ANTENNA

[75] Inventor: John R. Sanford, Sunnyvale, Calif.

[73] Assignee: Endgate Corporation, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/576,201

[22] Filed: Dec. 21, 1995

[51] Int. Cl.$^{6}$ .................................................... A01Q 13/02

[52] U.S. Cl. ............................................ 343/772; 343/786

[58] Field of Search .................................... 343/786, 776, 343/756, 781 R, 771, 772; H01Q 13/02

[56] References Cited

U.S. PATENT DOCUMENTS

| | | | |
|---|---|---|---|
| 2,656,464 | 10/1953 | Robinson | 343/781 R |
| 3,015,100 | 12/1961 | Rotman | 343/772 |
| 3,067,421 | 12/1962 | O'Nians et al. | 343/771 |
| 3,274,603 | 9/1966 | Kay | 343/786 |
| 3,631,502 | 12/1971 | Peters et al. | 343/786 |
| 3,653,054 | 3/1972 | Wen | 343/772 |
| 3,860,933 | 1/1975 | Terakawa et al. | 343/771 |
| 4,477,816 | 10/1984 | Cho | 343/786 |
| 4,618,865 | 10/1986 | Lamensdorf et al. | 343/776 |
| 4,638,323 | 1/1987 | Shnitkin et al. | 343/771 |
| 4,658,267 | 4/1987 | Roy et al. | 343/772 |
| 4,698,639 | 10/1987 | Mead et al. | 343/771 |

FOREIGN PATENT DOCUMENTS

| | | | |
|---|---|---|---|
| 726058 | 3/1955 | United Kingdom | 343/786 |

*Primary Examiner*—Michael C. Wimer
*Attorney, Agent, or Firm*—Steven J. Adamson; Edward B. Anderson

[57] ABSTRACT

A flared trough waveguide antenna capable of being used at high microwave and millimeter wave frequencies is disclosed herein. The antenna includes a conductive trough having first and second ends, a bottom surface, and first and second opposing side surfaces electrically coupled to the bottom surface. A conductive fin is electrically coupled to the bottom surface between the first and second opposing side surfaces. The bottom surface includes a first planar portion between the conductive fin and the first side surface, and a second planar portion between the conductive fin and the second side surface. The conductive trough may be induced to radiate electromagnetic energy by introducing an offset between the first and second planar portions with respect to the plane of the conductive fin. The antenna further includes first and second flared surfaces, respectively coupled to the first and second side surfaces, for directing electromagnetic energy radiated by the flared trough waveguide antenna. The first and second flared surfaces each optionally define a plurality of corrugations for attenuating sidelobes of the radiated electromagnetic beam pattern. A planar array may be realized by placing a plurality of flared trough waveguide antennas adjacent each other. Each antenna within the array includes first and second planar bottom portions arranged asymmetrically relative to the vertical plane of a conductive fin therebetween. Electromagnetic energy is coupled into one end of each of the antennas within the array by way of a feed system.

11 Claims, 17 Drawing Sheets

FLARED TROUGH WAVEGUIDE ANTENNA

BACKGROUND OF THE INVENTION

I. Field of the Invention

The present invention relates generally to open waveguide antennas, and more particularly to a flared trough waveguide antenna suitable for use at millimeter wave frequencies.

II. Description of the Related Art

The Federal Communications Commission is currently considering various proposals for redesignation of the 27.5 to 29.5 GHz frequency band for use by so-called Local Multipoint Distribution Services (LMDS). Developers of LMDS have proposed to offer broadband two-way video communications, including video distribution, teleconferencing, and data services using a cellular system design to establish communications links with subscribers. In this regard the of LMDS proponents seek to provide viable alternatives to the services offered by cable operators and local exchange carriers. It is anticipated that the cellular-like capabilities of LMDS will enable diverse services to be offered within the same region.

An LMDS system typically includes a plurality of hub transceivers used to create small cells, generally less than six miles diameter. Each hub transceiver transmits to subscriber locations and receives subscriber transmissions on a return path. Because of the typically small cell size, and arrangement in a typical cellular pattern, a very high level of frequency reuse is possible. The potential for high frequency reuse, in combination with the availability of broadband millimeter spectrum, results in the proposed LMDS systems possessing sufficient capacity to serve as wireless alternatives to existing telephone and cable providers.

The ability of LMDS to join services traditionally provided by separate communications service providers (e.g., cable television, telephony, video communications, data transfers, and interactive transactions) has created international interest. A number of countries have licensed LMDS technology on an experimental or permanent basis in the 28 GHz band. LMDS is believed to offer the prospect for modern wireless telephone systems, video distribution and the like to developing countries which do not have a wireline or cable infrastructure.

In order to facilitate a desired level of sectorization within the cells of an LMDS system, the hub or base station antenna system must be capable of providing antenna beam patterns of relatively high directivity. Moreover, the sidelobes of the beam associated with each sector should also be at least partially suppressed as a means of reducing interference between adjacent cell sectors. Unfortunately, it has hitherto been difficult to develop millimeter wave antenna systems capable of achieving such objectives in a manner which is both economical and highly power efficient. Although relatively efficient millimeter wave antenna architectures have been described, the complexity of many such architectures has resulted in comparatively high production and development costs. On the other hand, inexpensive planar array antennas (e.g., microstrip printed patch arrays) may provide the requisite directivity, but are typically inefficient due to the utilization of lossy feed networks in the distribution of power to the array radiators.

Accordingly, there exists a need for a millimeter wave antenna of relatively high directivity suitable for incorporation in LMDS and other millimeter wave communication system.

SUMMARY OF THE INVENTION

The present invention is directed to a flared trough waveguide antenna capable of being used at microwave and millimeter wave frequencies. The antenna includes a conductive trough having first and second ends, a bottom surface, and first and second opposing side surfaces electrically coupled to the bottom surface. A conductive fm is grounded to the bottom surface between the first and second opposing side surfaces. The bottom surface includes a first planar portion between the conductive fin and the first side surface, and a second planar portion between the conductive fin and the second side surface. In a preferred implementation the conductive trough is induced to radiate electromagnetic energy by introducing an offset between the first and second planar portions with respect to the plane of the conductive fin.

In accordance with one aspect of the invention, first and second flared surfaces respectively coupled to the first and second side surfaces are provided for directing electromagnetic energy radiated by the flared trough waveguide antenna. The first and second flared surfaces each optionally define a plurality of corrugations for reducing the sidelobe levels of the radiated electromagnetic beam pattern.

A planar array may be realized by placing a plurality of flared trough waveguide antennas adjacent each other. Each antenna includes first and second planar bottom portions arranged asymmetrically relative to the vertical plane of a conductive fin therebetween. Electromagnetic energy is coupled into one end of each of the antennas within the array by way of a feed system.

In a particular embodiment a polarizer structure comprised of one or more parallel grid or meander line polarizers is disposed above the aperture of the flared trough guide antenna. The polarizer structure may be configured such that the radiated electromagnetic energy is polarized either linearly or circularly in a desired direction.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
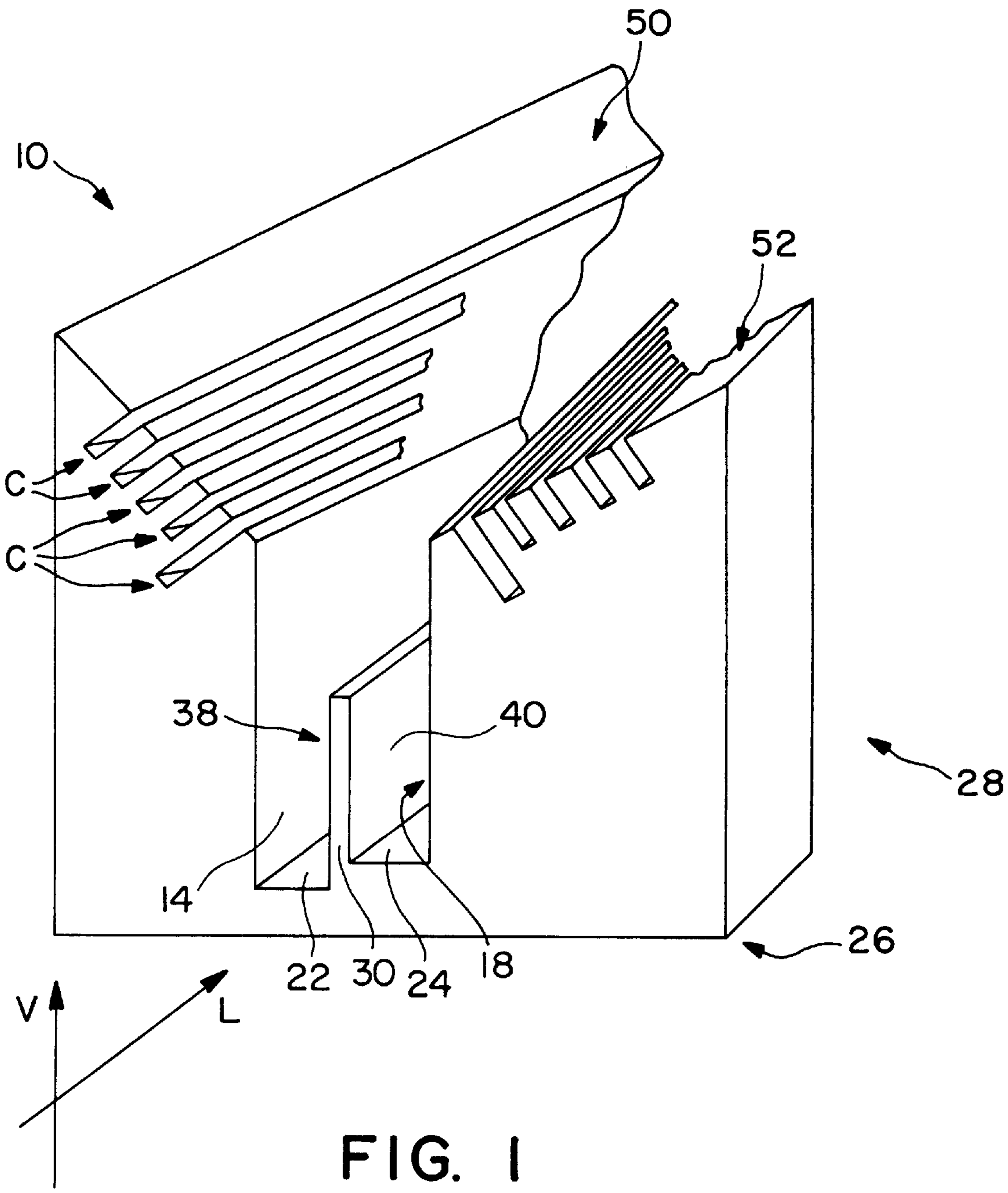
FIG. 1 provides a diagram of the flared trough waveguide antenna of the present invention.

A diagram of the flared trough waveguide antenna 10 of the present invention is shown in FIG. 1. As is described herein, the flared trough waveguide antenna 10 embodies a surface waveguide structure of comparatively low loss and relatively uncomplicated construction. These characteristics are advantageous at millimeter wave frequencies, where components become small and where ohmic loss may be appreciable.

The flared trough guide antenna 10 includes a conductive trough defined in part by first and second opposing side surfaces 14 and 18, which in the preferred embodiment are parallel to a longitudinal axis L of the antenna 10. The conductive trough is further defined by a bottom surface including first and second planar portions 22 and 24, which extend between first and second ends 26 and 28 of the antenna 10. In the implementation of FIG. 1 the first and second planar portions 22 and 24 are seen to be mutually offset in a vertical direction V perpendicular to the longitudinal axis L. Electromagnetic energy may be coupled from a rectangular waveguide into the conductive trough using a launch element (described below) mounted to either the first or second end of the antenna 10.

As is indicated by FIG. 1, the flared trough guide antenna 10 further includes a longitudinal conductive fin 30 disposed along a boundary between the first and second planar portions of the bottom surface. The conductive fin 30 defines a first face 38 opposing the first side surface 14, and a second face 40 opposing the second side surface 18. In addition, the flared trough guide antenna includes first and second optionally corrugated flared surfaces 50 and 52 extending from the first and second side surfaces 14 and 18. The flared trough guide antenna 10 supports propagation in a $TE_{10}$ mode, and radiates due to the vertical asymmetry between the first and second planar portions 22 and 24.

Figure 2A:
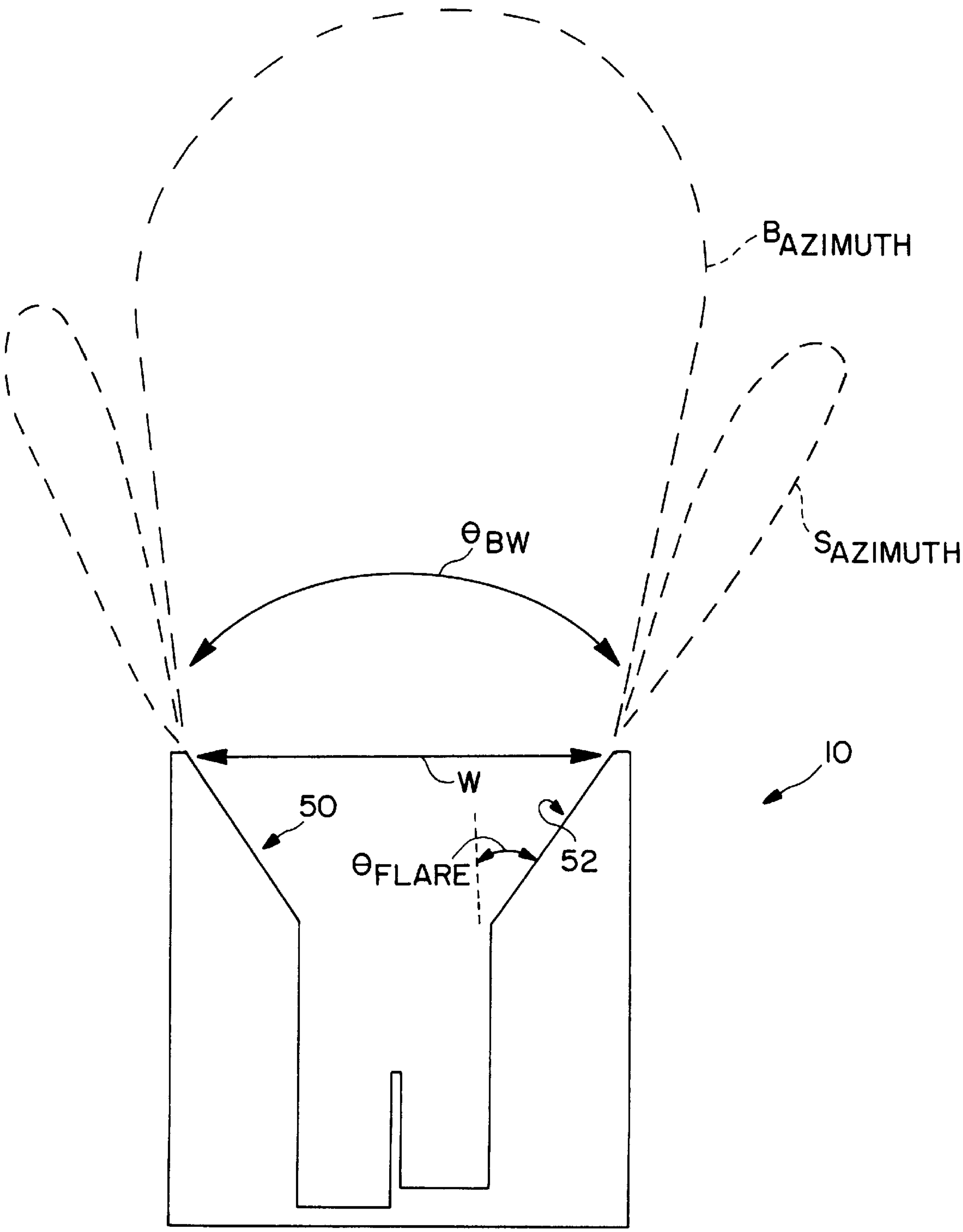
FIG. 2A provides a view of an azimuth beam pattern $B_{azimuth}$ radiated by the flared trough guide antenna in a plane perpendicular to its longitudinal axis.

FIG. 2A provides an azimuth view of the beam pattern $B_{azimuth}$ radiated by the antenna 10 in a plane perpendicular to the longitudinal axis L (i.e., an azimuth pattern). The flared corrugated surfaces 50 and 52 determine the azimuth beamwidth of electromagnetic energy radiated by the antenna 10. In particular, the beamwidth $\theta_{BW}$ of the antenna 10 in an azimuth plane may be approximated by the following expression:

$$\theta_{BW}=(70\ \mathrm{LAMBDA})/W$$

where W (FIG. 2) corresponds to the width of the flared aperture of the antenna 10. For relatively large flare angles (e.g., $\theta_{FLARE}$>50 degrees), the shape of the azimuth beam pattern may be controlled through adjustment of θFLARE. For instance, it has been found that a substantially "flat-topped" beam may be obtained using a flare angle $\theta_{FLARE}$ of approximately 60 degrees. Azimuth beam patterns of this shape are believed to be of particular utility in providing coverage within the separate sectors of multi-sector cells within cellular communication systems.

Referring again to FIG. 1, the flared surfaces 50 and 52 each optionally define a plurality of corrugations C. In a preferred implementation the corrugations C of the flared surfaces 50 and 52 are dimensioned so as to reduce the power of beam sidelobes ($S_{azimuth}$) in the azimuth plane. Each corrugation C will typically be of a depth, transverse to the plane of the flared surface, of either $\lambda_o/(4\cos\theta_{elevation})$ or $3\lambda_o(4\cos\theta_{elevation})$ wherein $\lambda_o$ denotes the free space wavelength of the electromagnetic energy radiated by the antenna 10. Typically, the corrugations C will be spaced along the flared surfaces at a density of at least four corrugations per unit wavelength ($\lambda_o$). The improved azimuth beam directivity afforded by the corrugations C advantageously enables increased sectorization within cells serviced by base station antenna arrays incorporating the one or more of the antennas 10.

Although the flared surfaces are described herein as being planar, in alternate implementations the flared surfaces may be generally non-linear. For example, beams of differing shape and directivity may be produced using flared surfaces of exponential, circular, or piecewise linear construction.

Figure 2B:
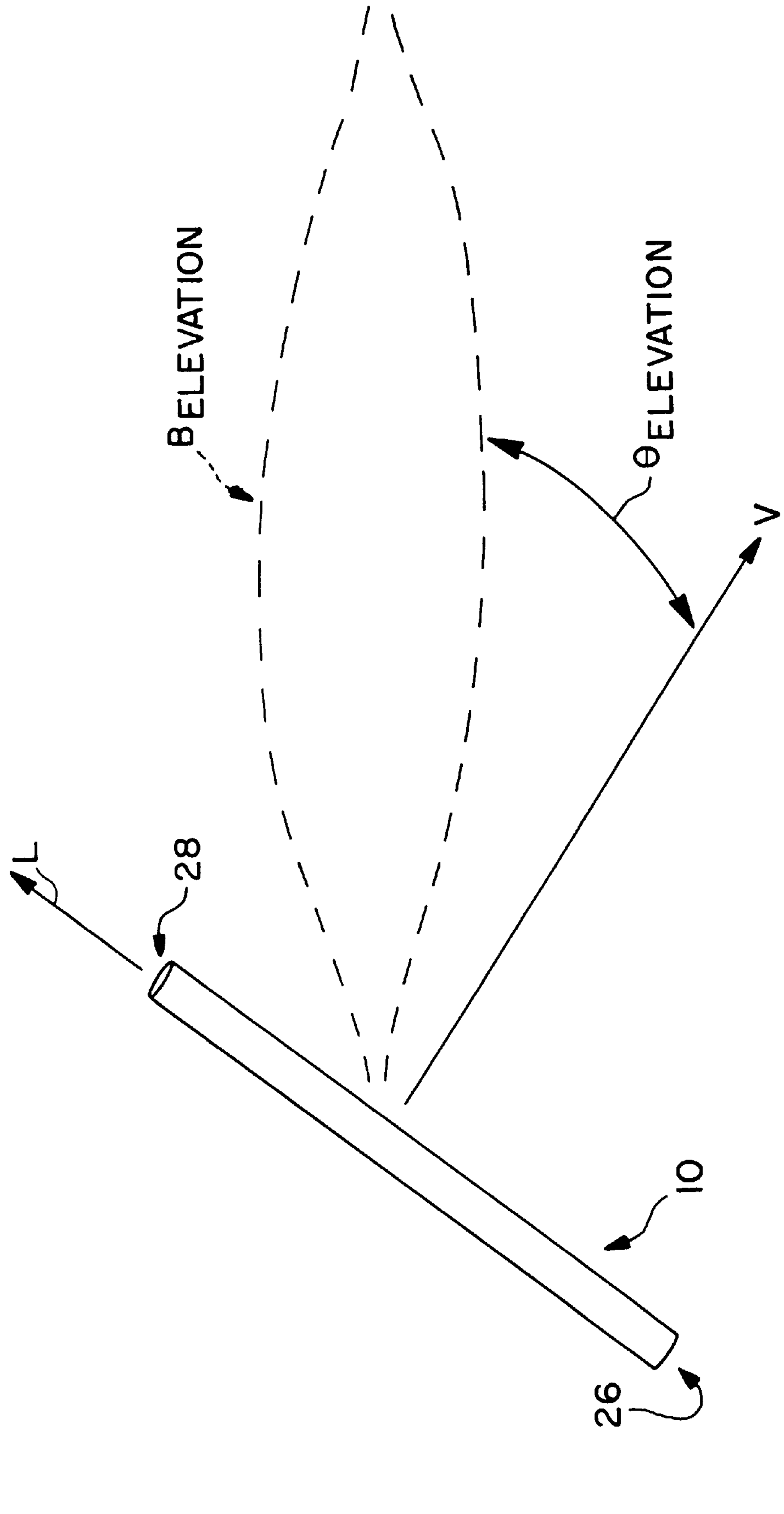
FIG. 2B illustratively represents an elevational view of an electromagnetic beam radiated by the flared trough guide antenna.

FIG. 2B illustratively represents an elevational view of the electromagnetic beam radiated by the antenna 10. Specifically, the elevational beam ($B_{elevation}$) is seen to be offset by an elevational angle $\theta_{elevation}$ from the vertical axis V of the antenna 10. The value of the elevational beam angle $\theta_{elevation}$ will typically range between 25 and 75 degrees, and may be determined from the following relationship:

$$\cos(\theta_{elevation})=(\lambda_o/\lambda_g)$$

where $\lambda_g$ denotes the wavelength of electromagnetic energy guided within the antenna 10.

Figure 3:
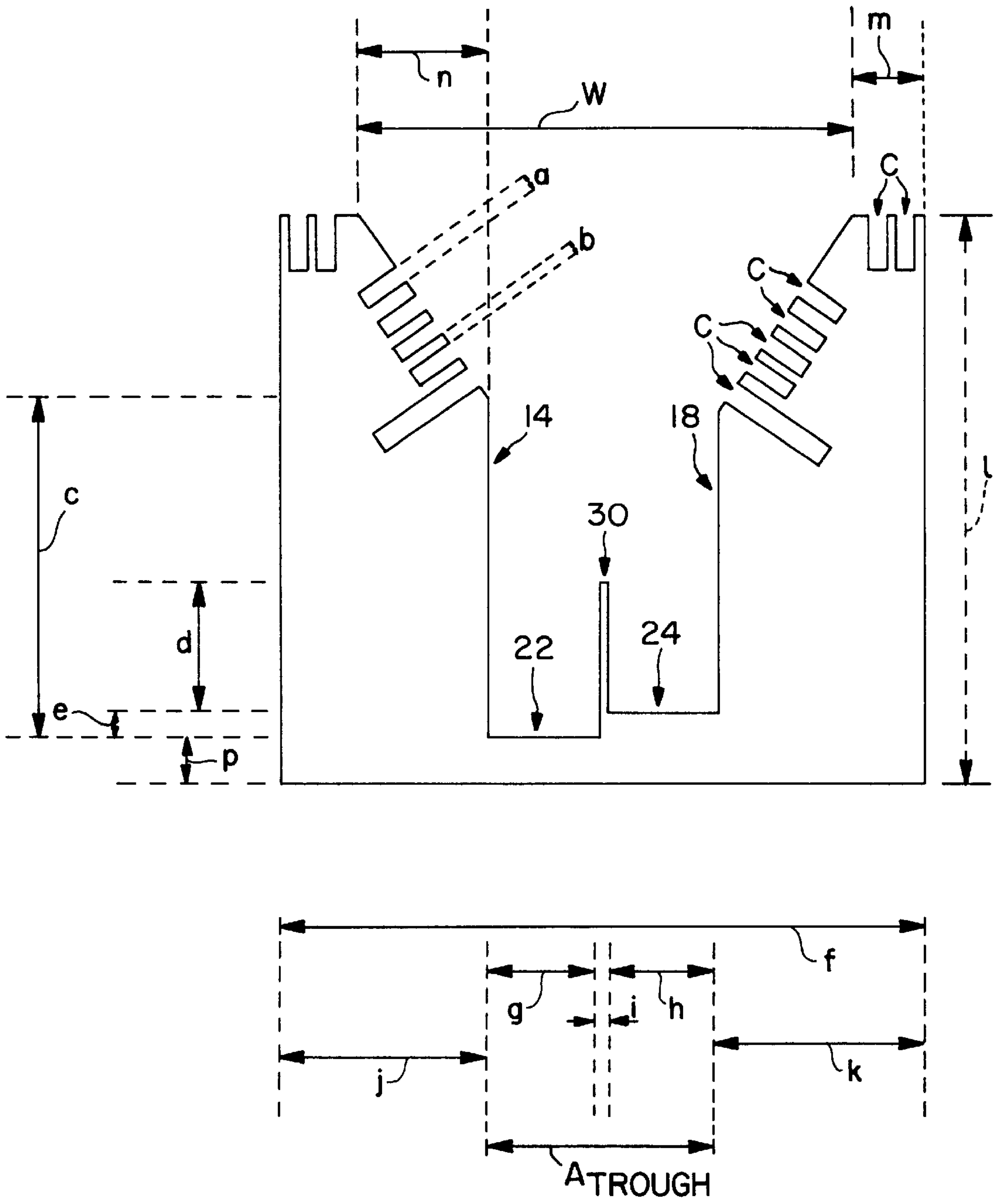
FIG. 3 shows an end view of an implementation of the flared trough guide antenna designed for operation between 27.5–29.5 GHz.

FIG. 3 shows an end view of an implementation of the flared trough guide antenna 10 designed for operation between 27.5–29.5 GHz. In TABLE I, an exemplary set of dimensions are listed for the flared trough antenna 10.

TABLE I

| Dimension | Length (Inches) |
|---|---|
| *a* | 0.06 |
| *b* | 0.03 |
| *c* | 0.15 |
| *d* | 0.14 |
| *e* | 0.03 |
| *f* | 0.5 |
| *g* | 0.04 |
| *h* | 0.04 |
| *i* | 0.02 |
| *j* | 0.20 |
| *k* | 0.20 |
| *l* | 0.45 |
| *m* | 0.10 |
| *n* | 0.10 |
| *p* | 0.067 |
| *w* | 0.30 |
| $A_{trough}$ | 0.10 |

In the exemplary antenna implementation represented by TABLE I, the antenna flare angle and trough dimensions were selected to produce a beam having azimuth and elevational widths of 2 degrees, and 40 degrees, respectively, and directivity of approximately 27 dB. In addition, the corrugations C in this exemplary implementation have been dimensioned so as to provide approximately 22 dB of suppression of the sidelobes $S_{azimuth}$. In the absence of corrugations, a flared trough guide antenna having the dimensions of TABLE I would be expected to exhibit approximately 13 dB of sidelobe suppression.

Figure 4A:
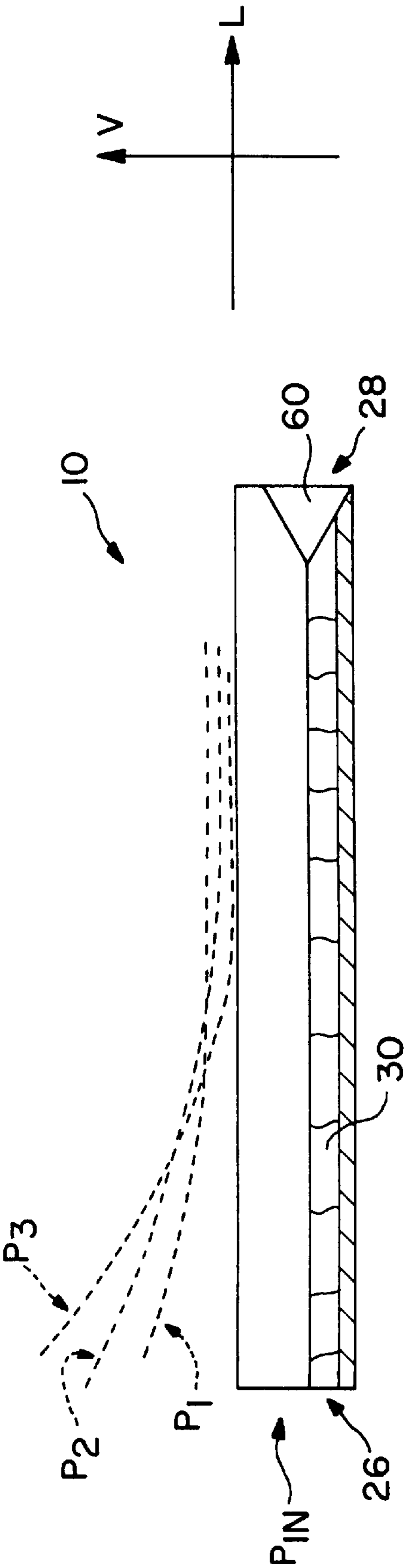
FIG. 4A depicts the relationship between the extent of vertical asymmetry between the first and second planar portions of the bottom antenna surface and the longitudinal distribution of radiated antenna power.

FIG. 4A depicts the relationship between the extent of vertical asymmetry between the first and second planar portions 22 and 24 and the longitudinal distribution of radiated antenna power. Specifically, the dashed lines labeled P1, P2 and P3 represent the power radiated by the antenna 10 as a function of longitudinal position for varying degrees of such vertical asymmetry (i.e., for varying "e" in TABLE I). Assuming electromagnetic energy ($P_{IN}$) to be coupled into the first antenna end 26, relatively more power (P3) is radiated from the proximal end 26 for large vertical asymmetry between the first and second planar portions 22 and 24 of the bottom surface. When the extent of such vertical asymmetry is reduced, less power is coupled from the antenna per unit length in the longitudinal dimension.

Figure 4B:
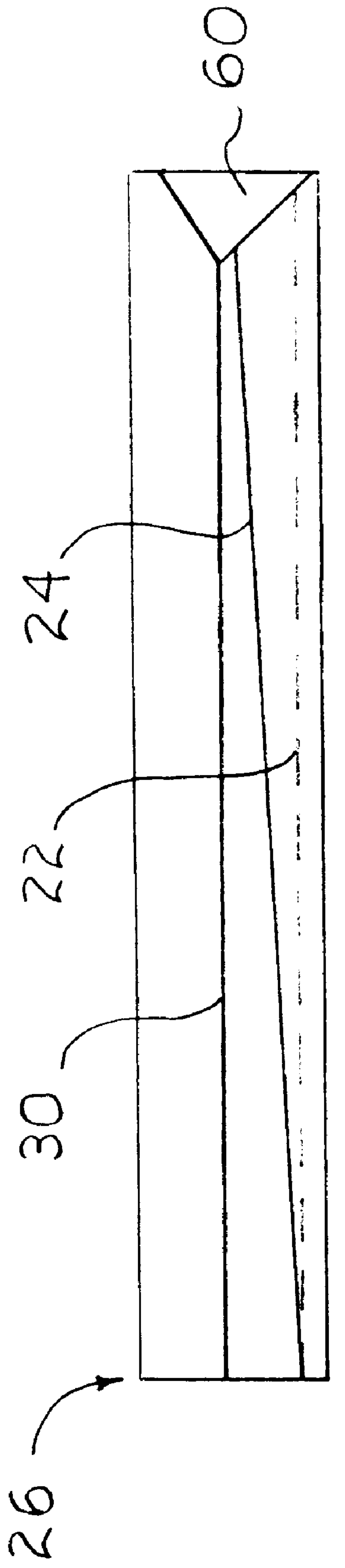
FIG. 4B illustrates the manner in which a more uniform longitudinal distribution of power may be obtained by tapering the vertical asymmetry between the planar bottom portions as a function of longitudinal position.

In FIG. 4B, an even more uniform longitudinal distribution of power (P1) is obtained when the vertical asymmetry between the planar bottom portions 22, 24 is varied as function of longitudinal position. In the implementation of FIG. 4B the vertical asymmetry is tapered from a maximum value (e.g., 0.05 inches) at the distal antenna end 28 to approximately zero at the proximal end 26. In the partially see-through side views of FIGS. 4A and 4B, the center conductive fin 30 is seen to transition into a wedge-shaped terminating load 60 made from standard absorber material (e.g., carbon impregnated foam or magnetically loaded rubber). The terminating load 60 prevents reflection of any residual electromagnetic energy reaching the second end of the antenna 28.

The antenna 10 may be fabricated as a unitary structure using conventional extrusion processes. In an exemplary fabrication process, the initial extrusion would render the separate planar portions of the bottom surface symmetrically oriented relative to the vertical plane of the center conductive fin. A desired degree of vertical offset could then be introduced between the planar bottom portions by etching the surface of one of the planar portions. Alternately, fabrication of the optionally corrugated flared surfaces and conductive trough would be done separately, with these elements then being mated using standard techniques.

Figure 5A:
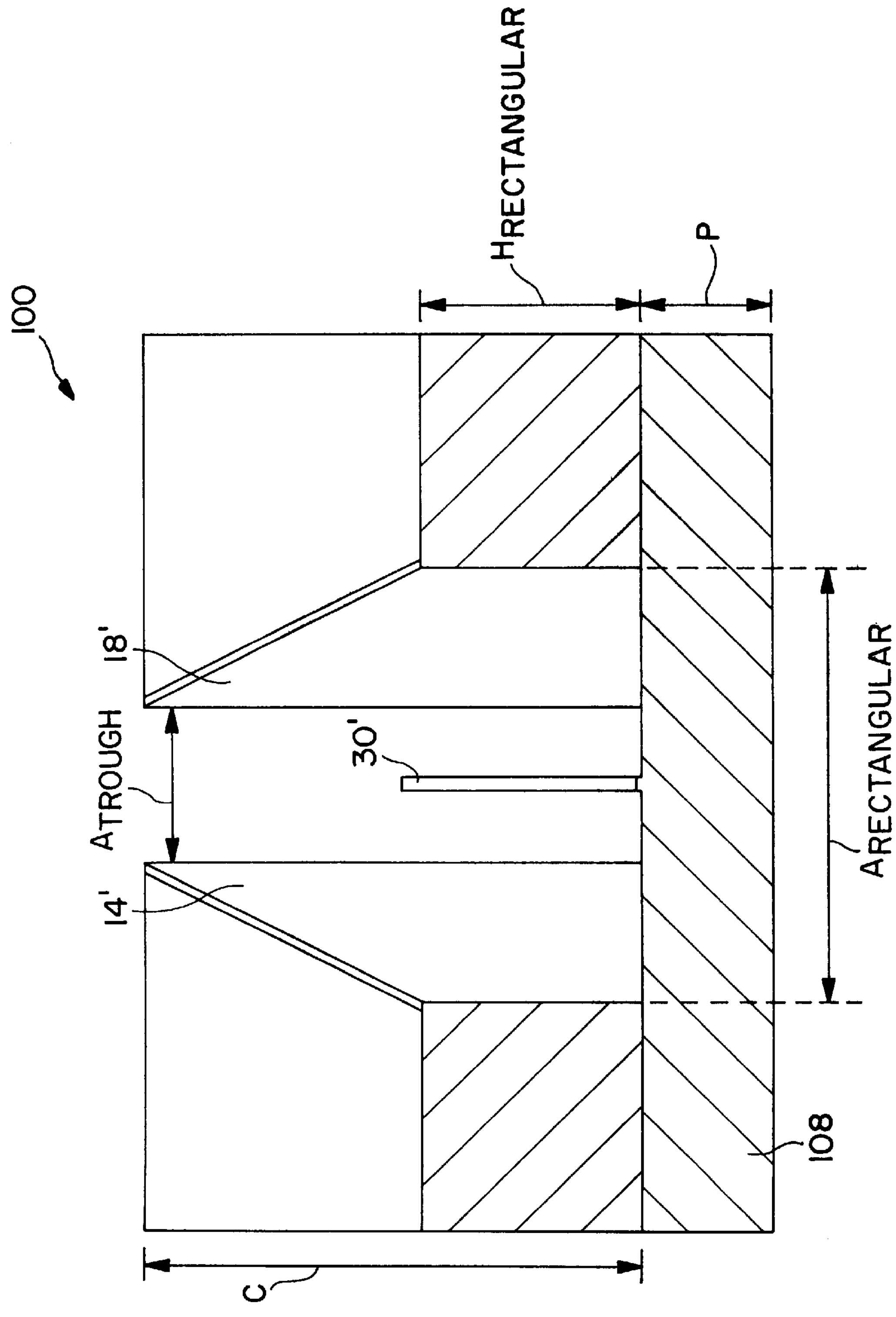
FIGS. 5A–5C respectively provide perspective, top and partially see-through side views of a launch element disposed to serve as a transition between the flared trough guide antenna 10 and a rectangular waveguide.
Figure 5B:
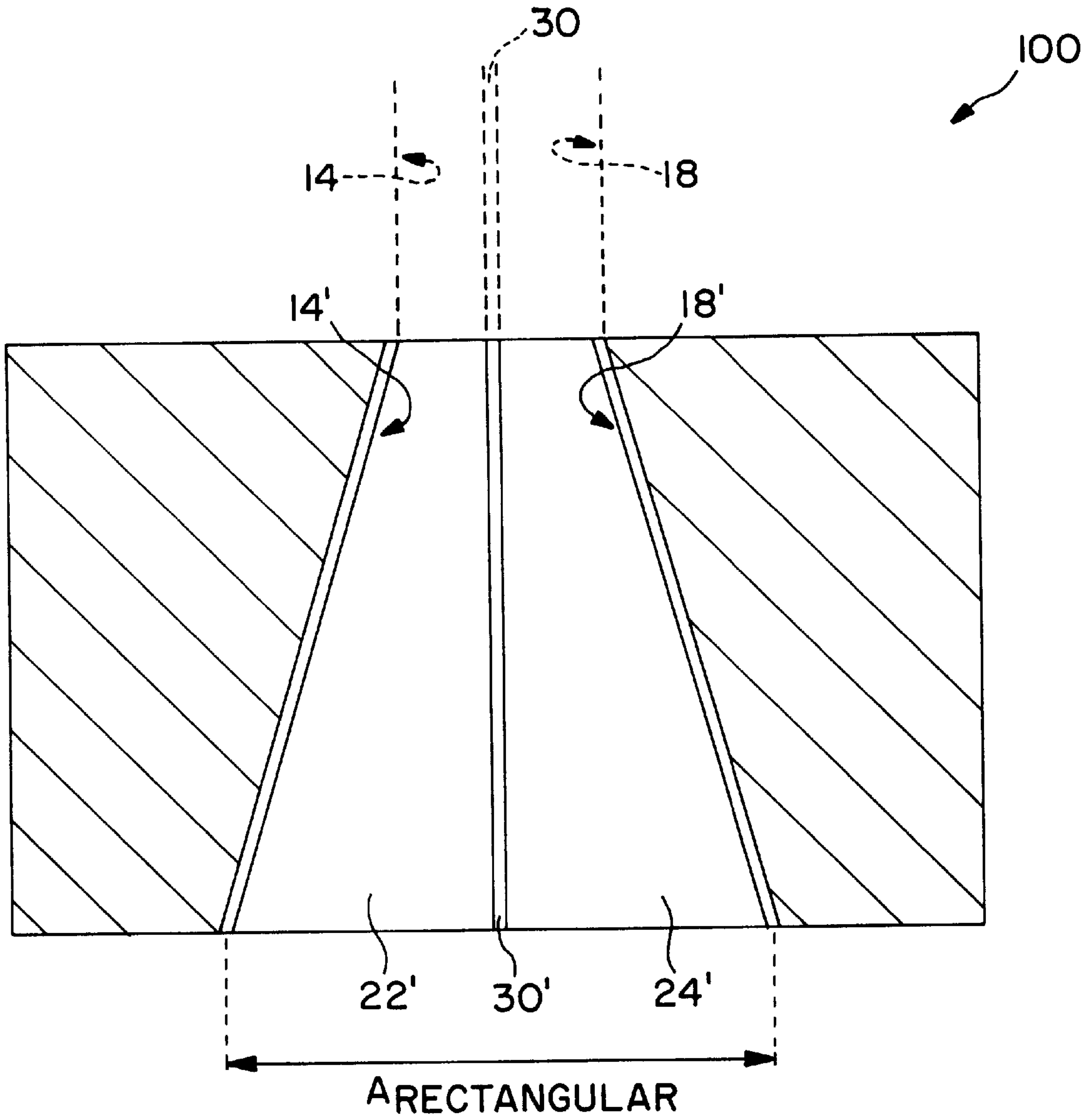
Figure 5C:
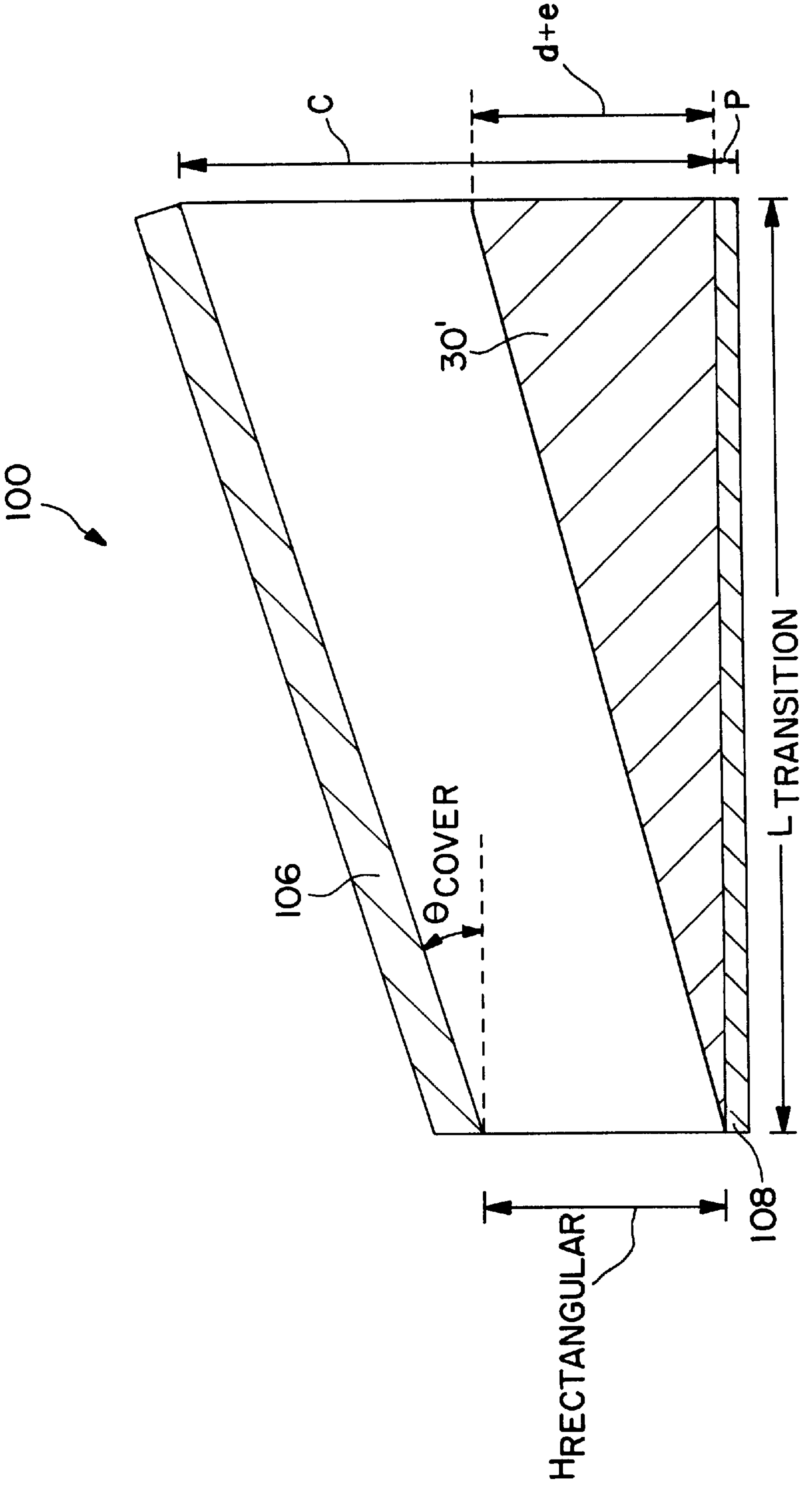

FIGS. 5A–5C respectively provide perspective, top and partially see-through side views of a launch element 100 disposed to serve as a transition between the flared trough guide antenna 10 and a rectangular waveguide. The launch element 100 may include a mating flange (not shown) for use in achieving mechanical coupling to either end of the antenna 10. As is indicated by FIGS. 5A and 5B, the opposing surfaces 14' and 18' of the launch element 100 narrow from a separation commensurate with the horizontal aperture width of rectangular waveguide (e.g., $A_{rectangular}$= 0.28 inches) to a separation equivalent to the width of the conductive trough ($A_{trough}$). Similarly, the bottom surfaces 22' and 24' of the launch element 100 transition to the widths and vertical offsets of the first and second planar bottom portions 22 and 24, respectively. A tapered center fin 30' is seen in FIG. 5C to rise from a height of approximately zero at a proximal end interface between the launch element 100 and rectangular waveguide, to a height of the conductive fin 30 (i.e., to a height of d+e) at a distal end of the launch element 100 contacting the antenna 10.

Referring to FIGS. 5A and 5C, the opposing surfaces 14' and 18' rise from a height of $H_{rectangular}$ (e.g., 0.14 inches) proximate the interface between the launch element 100 and rectangular waveguide, to a height of c (FIG. 3) at the point of contact with the antenna 10. The launch element 100 further includes a top cover 106 inclined at a predetermined angle (e.g., $\theta_{cover} \cong 9.65$ degrees) relative to horizontal. In addition, the launch element 100 is supported by a conductive base portion 108 extending a predetermined transition length (e.g., $L_{transition} \cong 1.0$ inch) between a rectangular waveguide and the antenna 10. In alternate implementations the center fin 30' may be of different transition lengths, and may non-linearly taper in height as a function of longitudinal position.

Figure 6A:
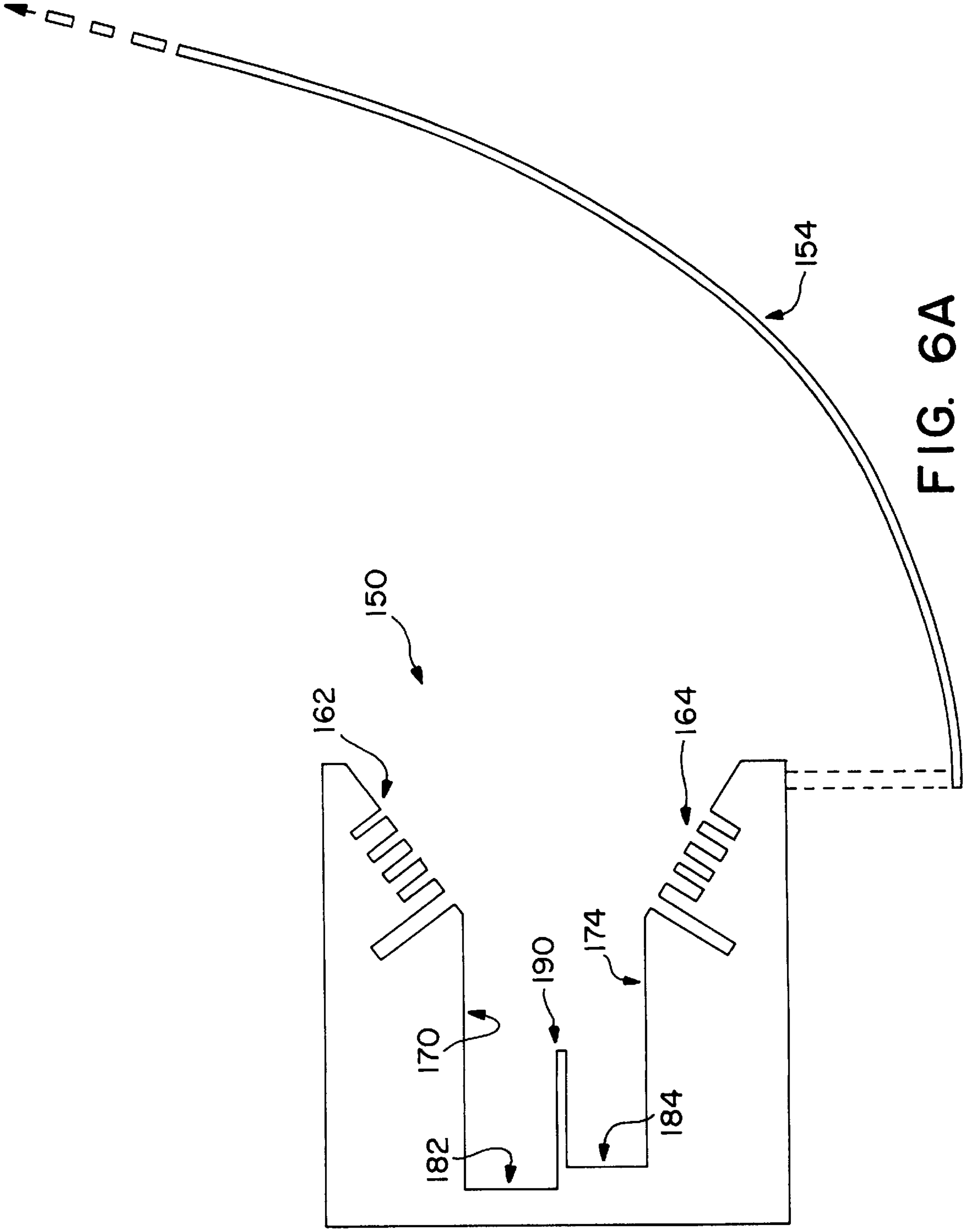
FIGS. 6A and 6B depict end and perspective views, respectively, of an embodiment of a flared trough guide antenna in combination with a cylindrical reflector.
Figure 6B:
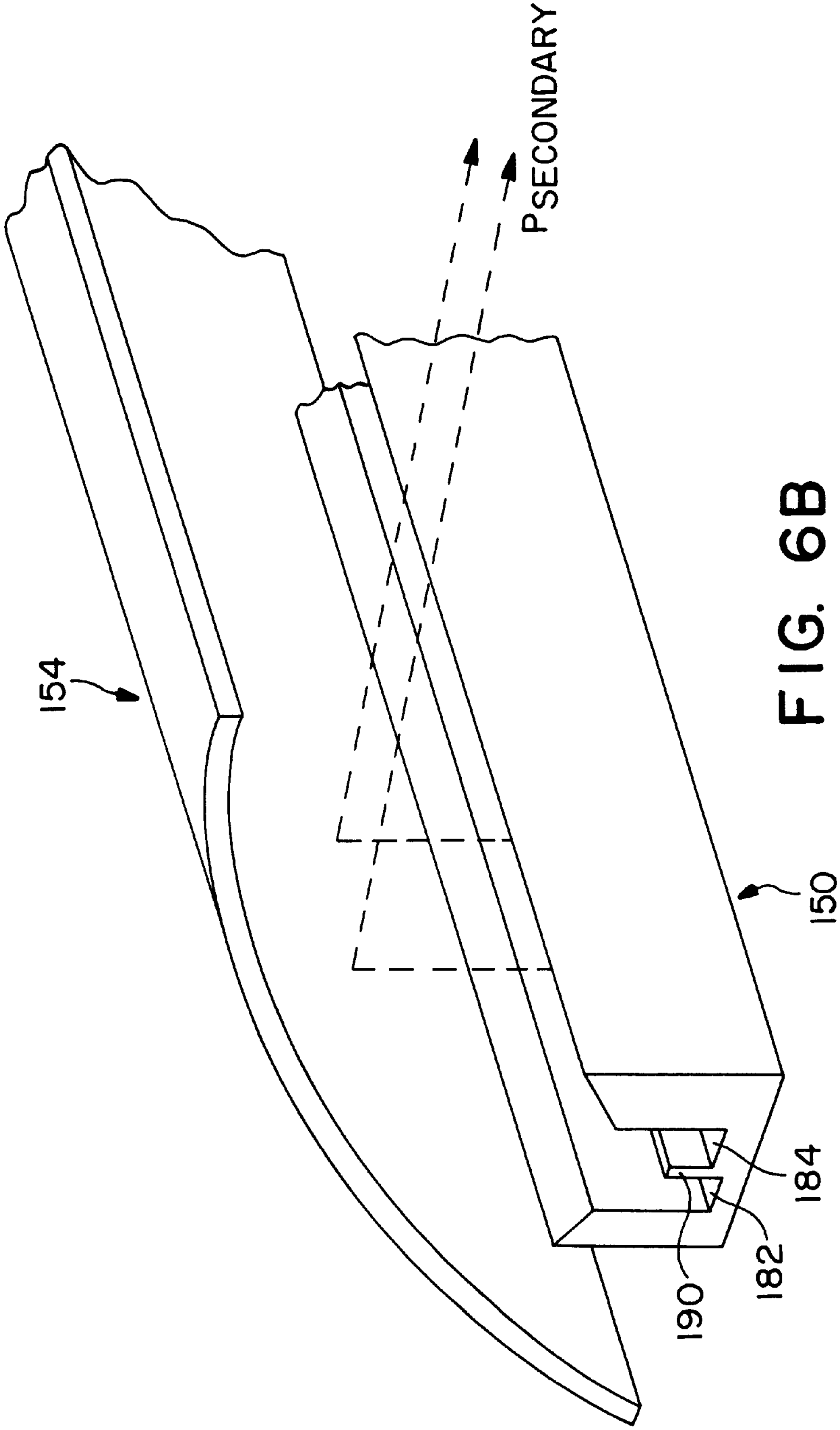

FIGS. 6A and 6B depict end and perspective views (not to scale), respectively, of an embodiment of a flared trough guide antenna 150 in combination with a cylindrical reflector 154. The flared trough guide antenna 150 is of an optionally corrugated flared structure substantially identical to that described with reference to FIGS. 1–4, and may be mechanically coupled to the cylindrical reflector 154.

Referring to FIG. 6A, the antenna 150 includes a conductive trough in electrical contact with first and second optionally corrugated flared surfaces 162 and 164 (corrugations not shown in FIG. 6B). The conductive trough is defined in part by first and second opposing and typically parallel side surface 170 and 174. The conductive trough is further defined by a bottom surface including first and second planar portions 182 and 184. As is indicated by FIG. 6A, the first and second planar portions 182 and 184 are seen to be mutually offset relative to the plane of center conductive fin 190. Again, electromagnetic energy may be coupled from a rectangular waveguide into the conductive trough using a launch element of the type described above.

The trough guide antenna efficiently illuminates the reflector 154 with a primary pattern having an amplitude and phase distribution appropriate in view of the reflector's size and shape. In response to the primary pattern, the reflector 154 provides a secondary pattern ($P_{secondary}$) of a directivity and beamwidth established by the size of the reflector's projection aperture. In this way the cylindrical reflector 154 allows the secondary pattern $P_{secondary}$ to be produced in a direction substantially transverse to the vertical axis V of the conductive trough.

Figure 7A:
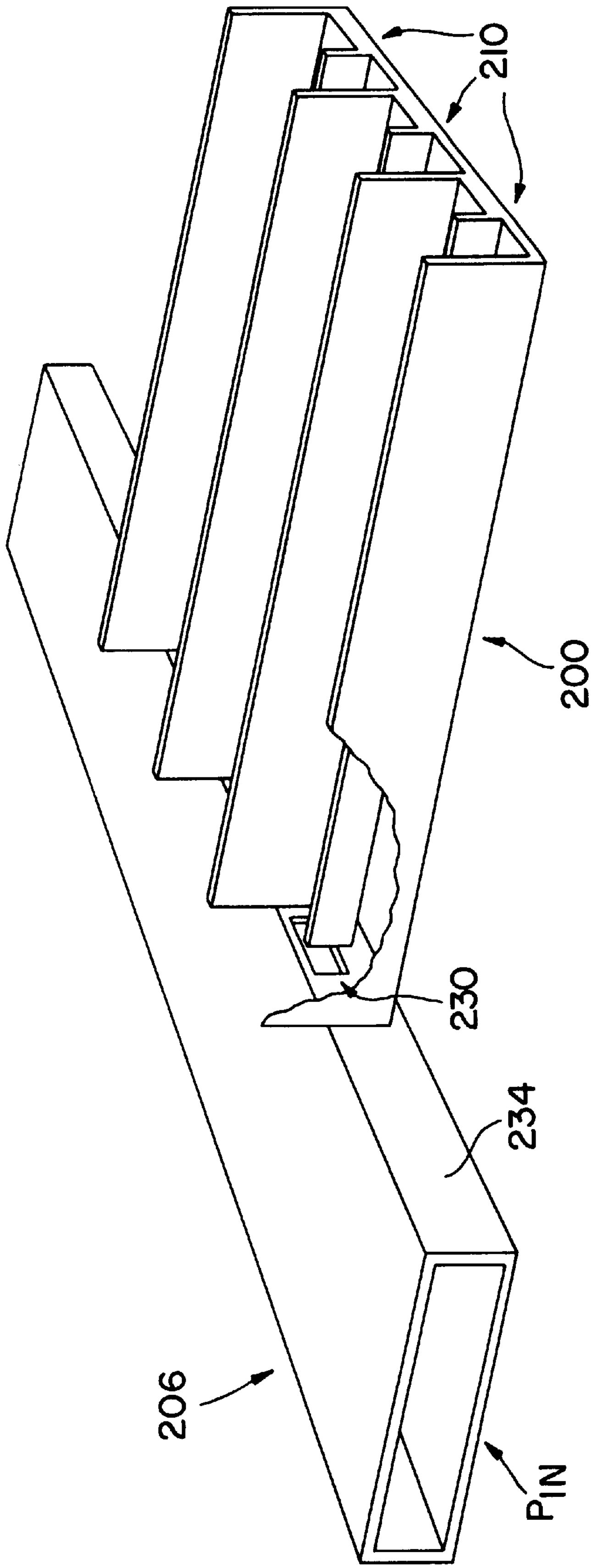
FIG. 7A provides a perspective view of an array of asymmetric trough guide antenna elements fed by energy from a rectangular waveguide.

Referring now to FIG. 7A, a perspective view is provided of an array 200 of asymmetric trough guide antenna elements fed by energy from a rectangular waveguide 206. Each asymmetric trough guide antenna element 210 of the array is fed by energy from a rectangular waveguide 206. Specifically, each antenna element 210 is seen to be electromagnetically coupled to the waveguide 206 by way of a slot or aperture 230 defined by a waveguide side wall 234. Although not shown in FIG. 7A, the distal end of each antenna element 210 will generally be terminated using a matched load of the type described above.

Figure 7B:
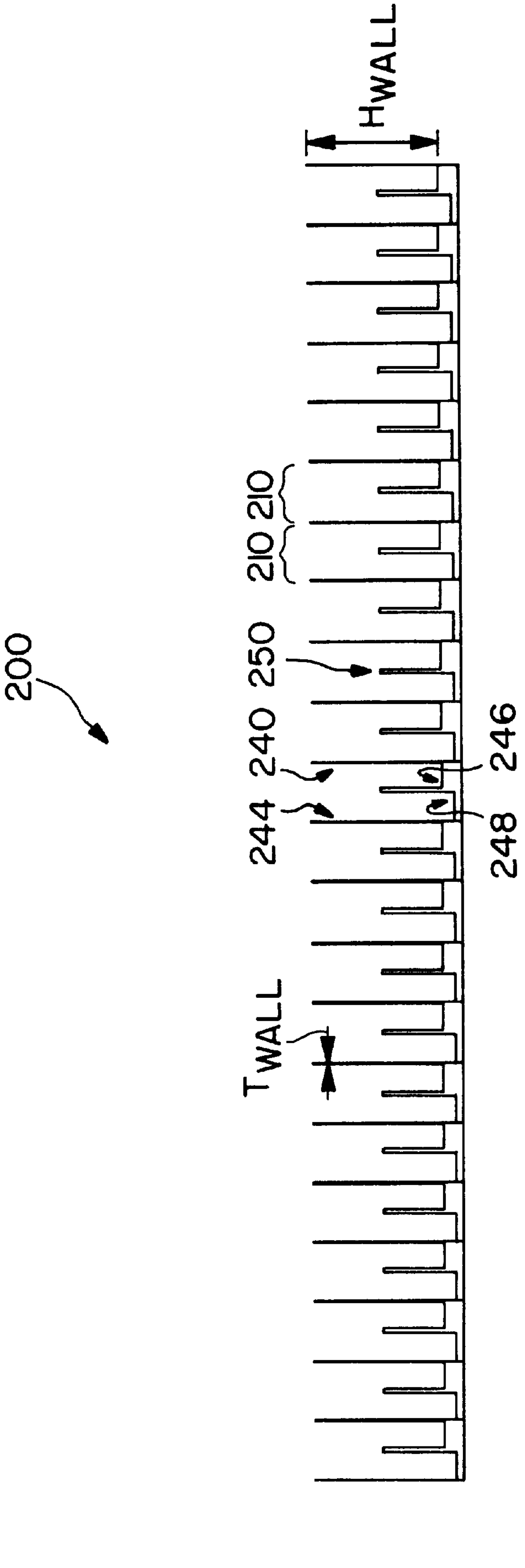
FIG. 7B provides a cross-sectional view of the array of antenna elements shown perspectively in FIG. 7A.

FIG. 7B provides a cross-sectional view of the array 200 of antenna elements 210. Each asymmetric trough guide antenna element 210 is laterally defined by first and second parallel side surfaces 240 and 244. The conductive trough of each element 210 is further defined by a bottom surface including first and second planar portions 246 and 248, which are seen to be mutually offset relative to the plane of center conductive fin 250. In the preferred embodiment of FIG. 7B, each lateral wall common to adjacent antenna elements 210 is of a predetermined height $H_{wall}$ (e.g., $H_{wall}$=0.2 inches) and thickness $T_{wall}$ (e.g., $T_{wall}$=0.01 inches).

Figure 8B:
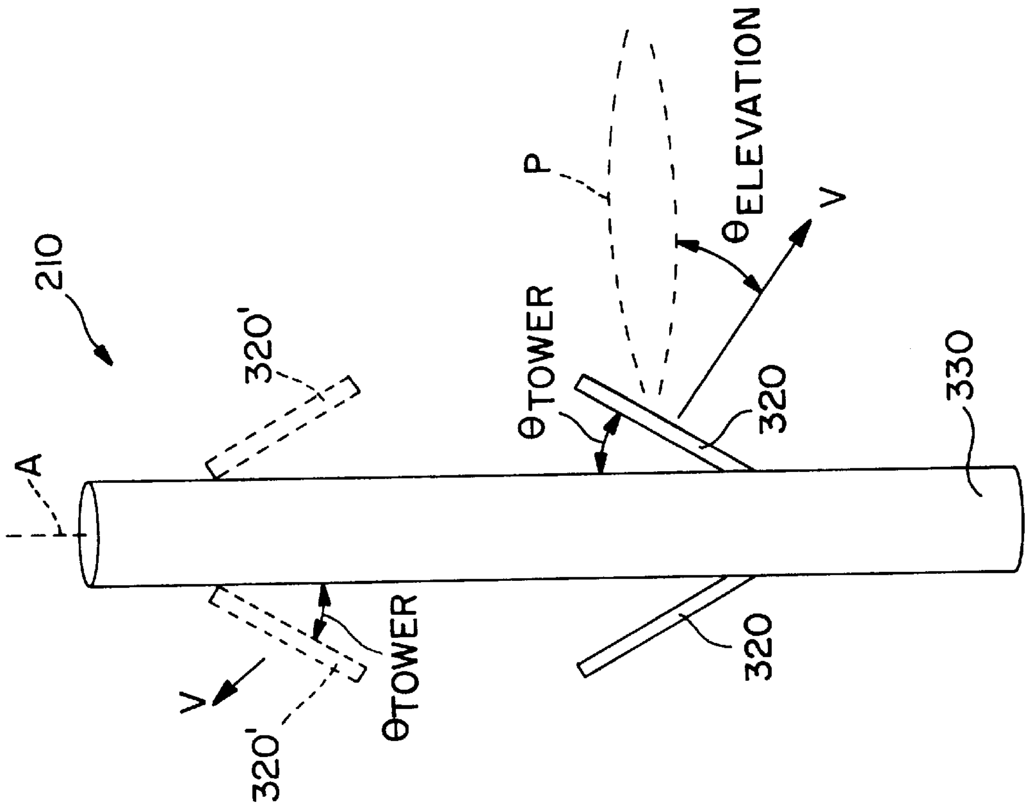
FIG. 8B provides a side view of a base station antenna tower upon which are mounted a plurality of flared trough waveguide antennas.
Figure 8A:
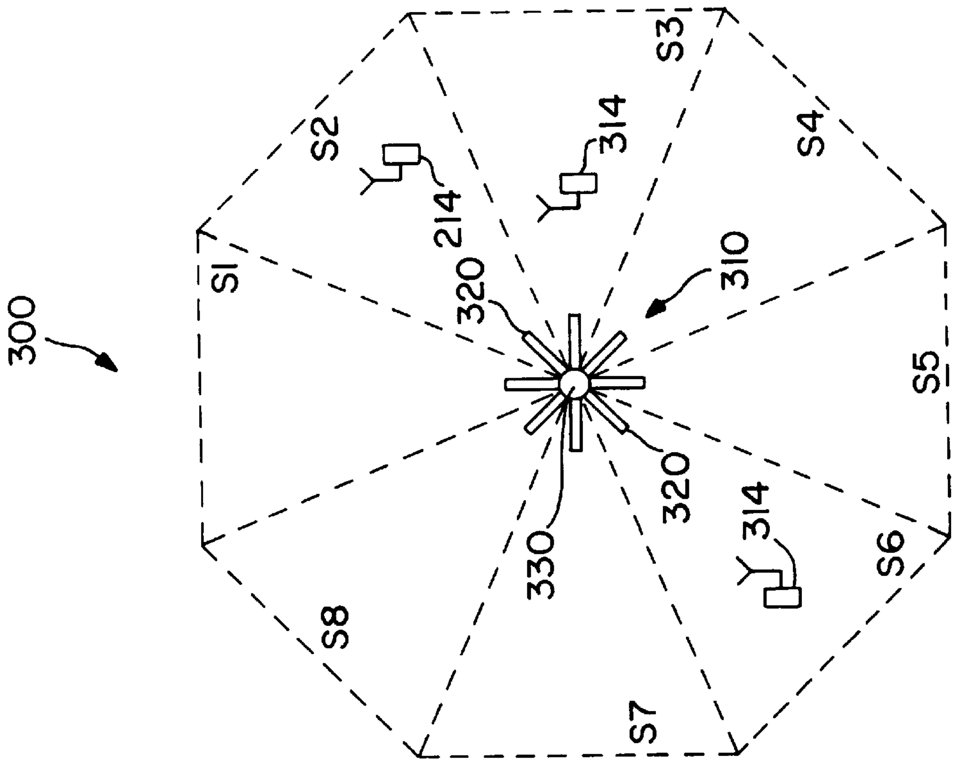
FIG. 8A shows a top view of an exemplary cell of an LMDS communication system.

Referring to FIG. 8A, there is shown a top view of a cell 300 included within an LMDS communication system. Within the cell 300 are disposed a base station antenna system 310 and a plurality of fixed and mobile subscriber units 314. The cell 300 is seen to be partitioned into a set of eight sectors S1–S8, which are illuminated by an array of flared trough guide antennas 320 mounted upon a tower 330. In the embodiment of FIG. 8A, each of the antennas 320 is implemented as described above with reference to FIGS. 1–4. In addition, a transition element of the type depicted in FIGS. 5A–5C is employed to couple each antenna 320 to a waveguide section in communication with a base station infrastructure (not shown).

As was described above with reference to FIG. 2B, the beam projected by the trough guide antenna of the invention is offset by an angle $\theta_{elevation}$ from a vertical axis V normal to the plane of the surface of the antenna bottom. Accordingly, in FIG. 8B each of the flared trough waveguide antennas 320 is seen to be oriented at an angle $\theta_{tower}$ relative to a vertical tower axis A as a means of achieving beam projection in a desired direction. For example, projection of a beam pattern P in a direction substantially normal to the vertical tower axis A may be achieved by selecting $\theta_{tower}$ to be equivalent to $\theta_{elevation}$. An alternate mounting configuration is indicated by the antennas 320' (shown in phantom), each of which are also oriented at the angle $\theta_{tower}$ relative to the vertical tower axis A.

Figure 9B:
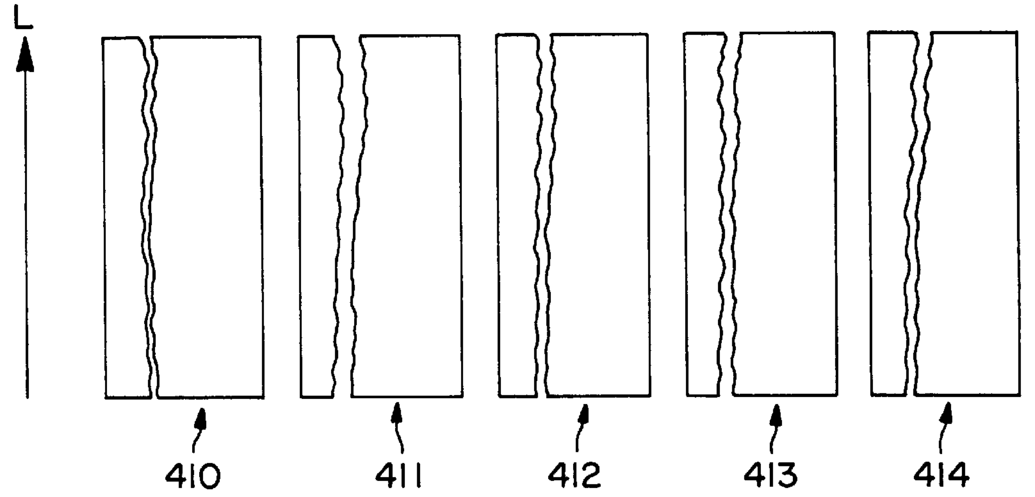
FIG. 9B illustrates the relative orientations of each of the polarizers within the stacked wire grid polarizer of FIG. 9A.
Figure 9A:
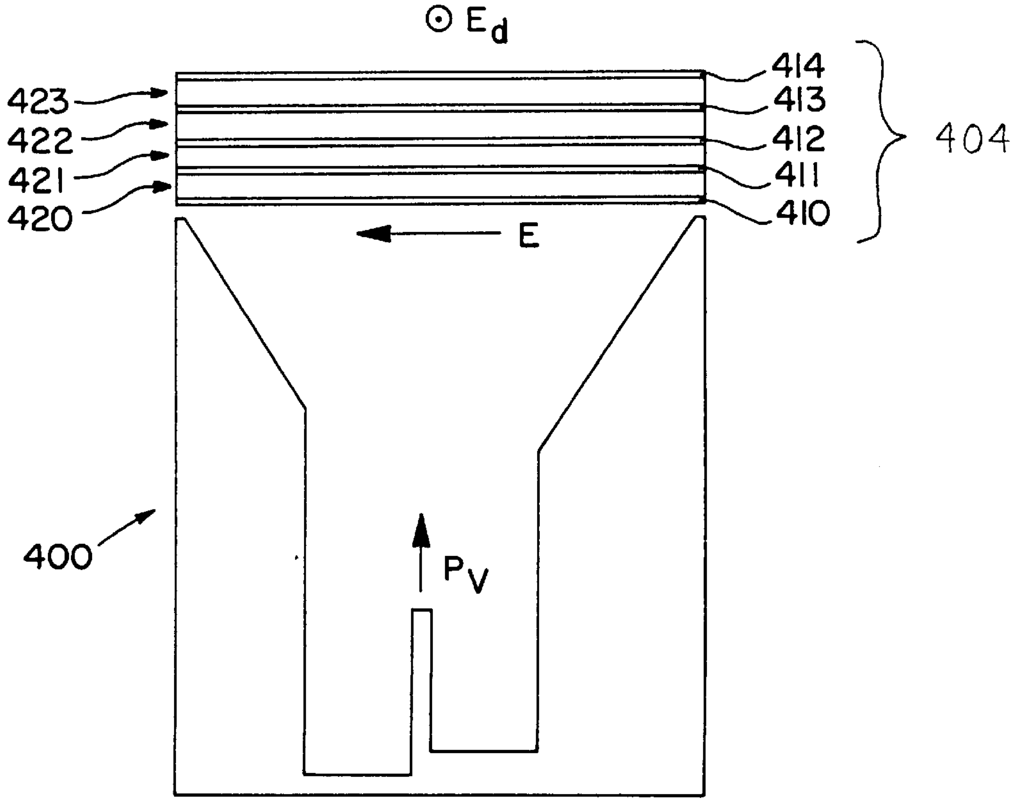
FIG. 9A depicts an end view of an embodiment of a flared trough guide antenna in combination with a stacked wire grid polarizer.

FIG. 9A depicts an end view of an embodiment of a flared trough guide antenna 400 in combination with a stacked wire grid polarizer 404. The flared trough guide antenna 400 is of an optionally corrugated flared structure substantially identical to that described with reference to FIGS. 1–4, and hence need not again be described. The stacked wire grid polarizer 404 includes N layers (e.g., N=5) of parallel conductor polarizers 410–414 arranged in the aperture of the trough guide antenna 400 in stacked horizontal planes substantially normal to a vertical plane $P_v$ of the center conductive fin. The polarizers 410–414 are respectively separated by low-loss dielectric foam spacers 420–423.

As is illustrated in FIG. 9B, each wire grid polarizer 410–414 respectively includes a set of parallel conductive lines (e.g., wires) L1, L2, L3, and L4, each set being oriented in a different direction relative to the longitudinal axis L of the flared trough guide antenna 400. More particularly, the orientations of the wire grid polarizers 410–414 are incrementally rotated in the horizontal dimension in such a way that the uppermost polarizer 414 becomes aligned normal to the desired polarization direction of the radiated electromagnetic energy. In the specific case of FIG. 9B, the polarizers 410–414 serve to rotate the nominal polarization $E_0$ of the antenna to a desired electric field polarization $E_d$ parallel to the longitudinal axis L. The diameter or width of the parallel conductive lines L1–L4, as well as the spacing in each horizontal plane between the lines within each set, are selected using conventional techniques as a means of obtaining desired transmission and reflection characteristics. See, for example, Amitay and Saleh, *Broadband Wide Angle Quasi-optical Polarization Rotations*, IEEE Transactions on Antennas and Propagation, vol. AP-31, No. 1, January 1983.

Figure 10B:
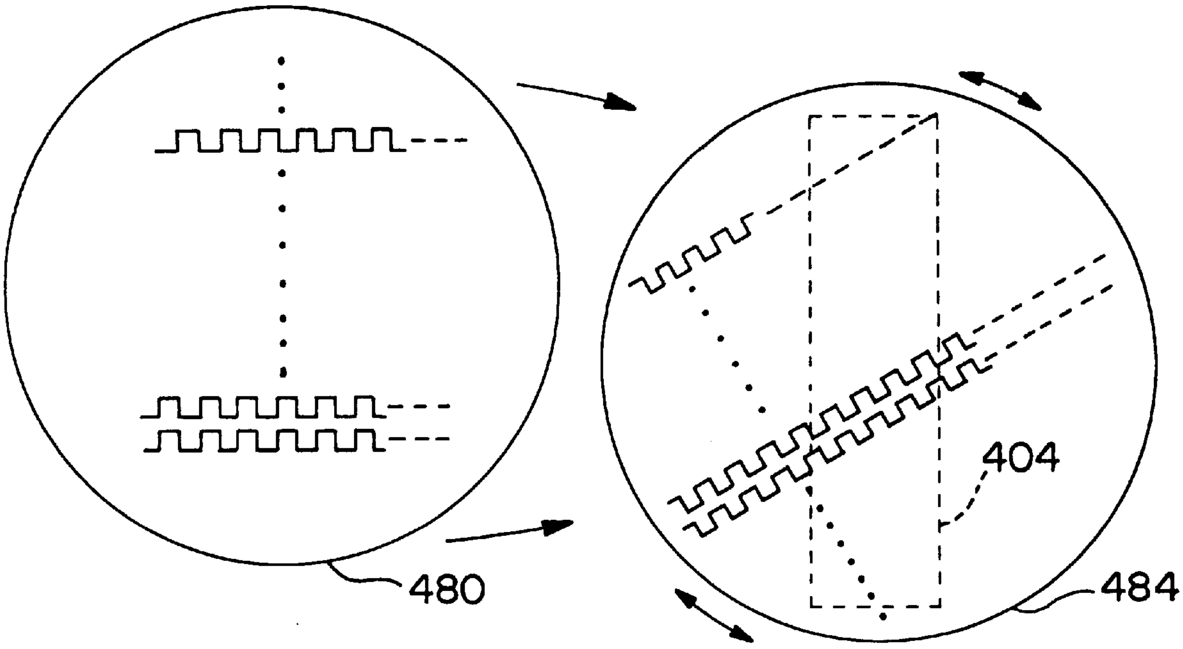
FIGS. 10A and 10B depict end and top views of an embodiment of a flared trough guide antenna in combination with a stacked pair of meander line polarizers.
Figure 10A:
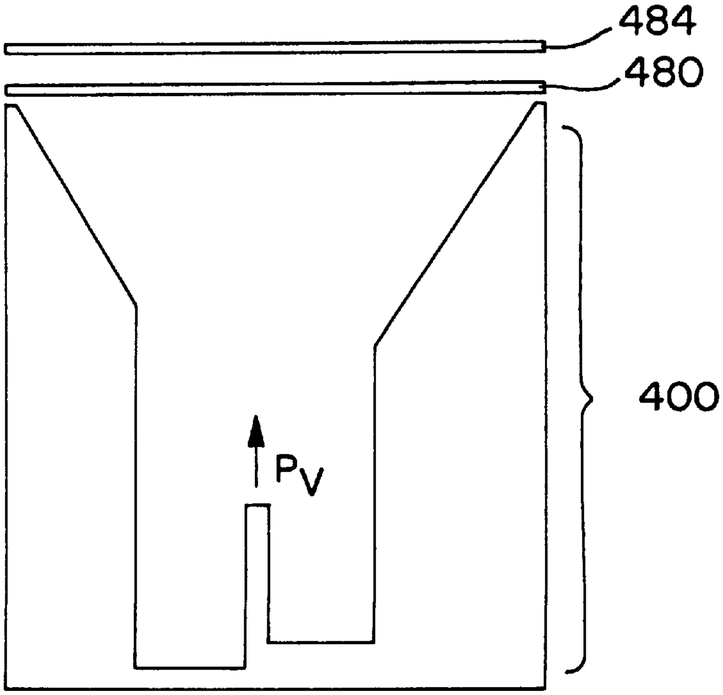

FIGS. 10A and 10B depict end and top views of an embodiment of a flared trough guide antenna 400 in combination with a stacked pair of lower and upper meander line polarizers 480 and 484, respectively. The meander line polarizer 480 will typically be of fixed orientation in the horizontal dimension, and serves to convert the nominal linear polarization $E_0$ of the antenna to circular polarization. Although shown in FIG. 10A as being employed in conjunction with the upper meander line polarizer 484, the lower meander line polarizer 480 may be used independently when it is desired that the radiated electromagnetic energy be of circular polarization.

The upper meander line polarizer 484 transforms the circularly polarized electromagnetic energy from the lower meander line polarizer 480 back into energy linearly polarized in a desired direction. In this regard the upper meander line polarizer 484 may be rotated using conventional means to a desired orientation in the horizontal dimension relative to the orientation of lower meander line polarizer 480. Accordingly, linear polarization in the desired direction is effected through appropriate rotation of the upper meander line polarizer 484. In this implementation the upper meander line polarizer 484 is of circular cross-section in the horizontal dimension, and extends beyond the periphery of the flared trough guide antenna 400.

Figure 10C:
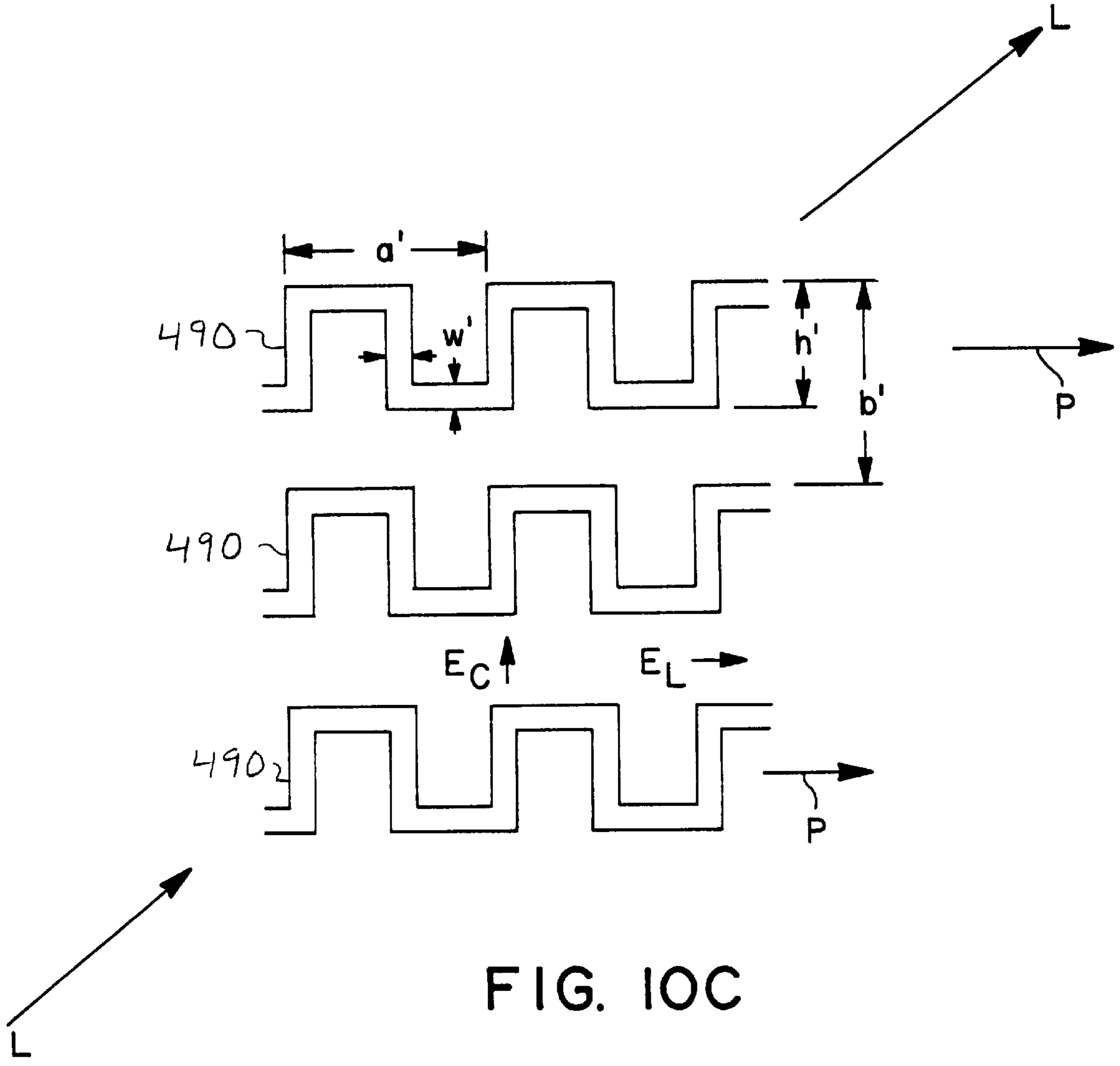
FIG. 10C depicts the polarizer patterns.

Referring to FIG. 10C, each meander line polarizer 480 and 484 includes a plurality of spaced square wave printed circuit patterns 490 designed to provide reactive loading to orthogonal components of the incident electric field. Specifically, an electric field component parallel to the direction of progression (P) of the circuit patterns 490 is inductively loaded, while the field component orthogonal thereto is capacitively loaded. Accordingly, the electric field from the antenna 404 may be circularly polarized by orienting the meander line polarizer such that the progression direction P is at 45 degrees to the incident field $E_0$. Circular polarization of a first "sense" or direction relative is obtained by orientation of the polarizer 480 such that P is at +45 degrees relative to $E_0$, while the opposite sense of circular polarization is produced by placing the polarizer 480 such that P is at −45 degrees relative to $E_0$. The meander line period a', width w', and inter-pattern spacing b', are frequency-dependent and may be determined using conventional design techniques.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A flared trough waveguide antenna, comprising:

a conductive trough having first and second ends, a bottom surface, and first and second opposing side surfaces electrically coupled to said bottom surface;

a conductive fin, electrically coupled to said bottom surface between said first and second opposing side surfaces, that divides said trough into a first waveguide region adjacent said first side surface and a second waveguide region adjacent said second side surface, said conductive trough and said fin being configured such that said first and said second waveguide regions each receive and propagate a signal having an electric field generally perpendicular to said fin and directed outwardly therefrom;

said conductive fin further having a substantially solid first face opposing at least a portion of said first side surface and a substantially solid second face opposing at least a portion of said second side surface; and a first and a second flared surface respectively coupled to said first and said second opposing side surfaces, said flared surfaces being configured in such a manner as to direct electromagnetic energy radiated by said flared trough waveguide antenna in a desired pattern;

wherein said at least one of said first and second flared surfaces is configured to define a plurality of longitudinally disposed corrugations including a first and a second corrugation, said first corrugation having a greater depth than said second corrugation.

2. The flared trough waveguide antenna of claim 1, wherein said first corrugation is provided between said trough and said second corrugation.

3. The flared trough waveguide antenna of claim 2, wherein said first corrugation has a depth of approximately ¾ of a design wavelength or an integer multiple thereof and said second corrugation has a depth of approximately ¼ of a design wavelength or an integer multiple thereof.

4. The flared trough waveguide antenna of claim 1, wherein said first corrugation has a depth of approximately an integer multiple of $3\lambda_0/4 \text{ Cos } \theta_{elevation}$ and said second corrugation has a depth of approximately an integer multiple of $\lambda_0/4 \text{ Cos } \theta_{elevation}$, where $\theta_{elevation}$ is generally equal to $\lambda_0/\lambda_g$, $\lambda_0$ denotes the free space wavelength of the electromagnetic energy radiated by the antenna, $\lambda_g$ denotes the wavelength of electromagnetic energy guided within the antenna and $\text{Cos } \theta_{elevation}$ has a value of less than one.

5. A flared trough waveguide antenna, comprising:

a conductive trough having first and second ends, a bottom surface having first and second planar portions, and first and second parallel side surfaces electrically coupled to said first and second planar portions of said bottom surface, respectively;

a conductive fin electrically coupled to said bottom surface along a boundary between said first and second planar portions; and a first flared surface coupled to said first side surface and a second flared surface coupled to said second side surface, said first and said second flared surfaces being configured in such a manner as to direct electromagnetic energy radiated by said flared trough waveguide antenna in a desired pattern;

wherein said first and second planar portions are offset relative to a vertical plane defined by said conductive fin so as to expel energy propagating through said trough and an extent to which said first and second planar portions are offset relative to said vertical plane varies between said first and second ends.

6. The flared trough waveguide antenna of claim 5 wherein said first flared surface is oriented at a predetermined angle relative to said first side surface and defines at least a first corrugation extending between said first and seconds ends, said corrugation having a depth of approximately an odd integer multiple of $\lambda_0/4 \text{ Cos } \theta_{elevation}$, where $\theta_{elevation}$ is generally equal to $\lambda_o/\lambda_g$, $\lambda_o$ denotes the free space wavelength of the electromagnetic energy radiated by the antenna and $\lambda_g$ denotes the wavelength of electromagnetic energy guided with the antenna.

7. The flared trough waveguide antenna of claim 5 wherein said varied offset varies gradually so that electromagnetic energy is radiated from said trough waveguide antenna without significant reflection.

8. The flared trough waveguide antenna of claim 5, wherein said first and second planar portions have different slopes.

9. The trough waveguide antenna of claim 5, wherein at least one of said first and second flared surfaces includes a plurality of longitudinally disposed corrugations.

10. A flared trough waveguide antenna, comprising:

a conductive trough having a first and a second end, a bottom surface, and first and second opposing side surfaces electrically coupled to said bottom surface;

a conductive fin, electrically coupled to said bottom surface between said first and second opposing side surfaces, that divides said trough into a first waveguide region adjacent said first side surface and a second waveguide region adjacent said second side surface;

a first and a second flared surface respectively coupled to said first and said second opposing side surfaces, said flared surfaces being configured in such a manner as to direct electromagnetic energy radiated by said flared trough waveguide antenna in a desired pattern;

a plurality of first corrugations formed on at least one of said first and second flared surfaces, said corrugations being aligned generally in parallel with a longitudinal axis of said trough and having a depth of approximately an odd integer multiple of $\lambda_o/4 \text{ Cos } \theta_{elevation}$, where $\theta_{elevation}$ is generally equal to $\lambda_0/\lambda_g$, $\lambda_o$ denotes the free space wavelength of the electromagnetic energy radiated by the antenna, $\lambda_g$ denotes the wavelength of electromagnetic energy guided within the antenna and $\text{Cos } \theta_{elevation}$ has a value of less than one.

11. The trough waveguide antenna of claim 10, further comprising an additional corrugation provided between said first corrugations and said trough that has a depth greater than that of said first corrugations.

* * * * *